United States Patent

[11] 3,626,165

[72] Inventor Robert E. McCall
Columbus, Ohio
[21] Appl. No. 790,380
[22] Filed Jan. 10, 1969
[45] Patented Dec. 7, 1971
[73] Assignee Industrial Nucleonics Corporation

[54] CONTROL SYSTEM
6 Claims, 4 Drawing Figs.

[52] U.S. Cl. .................................................. 235/151.3, 235/151.35
[51] Int. Cl. .......................................................... G01d 21/00
[50] Field of Search ............................................ 235/151.35, 151.3; 250/83.3

[56] References Cited
UNITED STATES PATENTS

| | | | |
|---|---|---|---|
| 3,000,438 | 9/1961 | Alexander | 162/259 |
| 3,006,225 | 10/1961 | Mamas | 72/234 X |
| 3,007,052 | 10/1961 | Hickman et al. | 250/83.3 |
| 3,067,939 | 12/1962 | Ziffer | 235/183 |
| 3,191,015 | 6/1965 | Hansen et al. | 235/183 |
| 3,244,206 | 4/1966 | Bossen | 144/209 |
| 3,378,676 | 4/1968 | Clement | 235/151.3 |
| 3,413,192 | 11/1968 | Beecher | 162/259 |
| 3,471,685 | 10/1969 | Bishop | 235/151.3 X |
| 3,562,500 | 2/1971 | Grant | 235/151.3 |
| 3,471,685 | 10/1969 | Bishop | 235/151.3 X |

*Primary Examiner*—Malcolm A. Morrison
*Assistant Examiner*—Edward J. Wise
*Attorneys*—William T. Fryer, III and C. Henry Peterson ABSTRACT: A control system for a rubber calender incorporates features that improve profile and machine direction thickness control. In one embodiment a single gauge scans continuously across the rubber sheet and is coupled to a first profile average computer (PAC) to average the thickness of one edge zone. While the gauge is scanning the first zone the gauge is also coupled to a second PAC that averages the thickness of a center zone including contiguous portions of the edge zones. The first PAC is used to average the other edge zone. Each averaged edge zone includes substantially the entire half of the sheet width, so that the average of the edge zones is substantially the average of the sheet width and more representative of the portions controlled by adjustment of the respective screwdown motors. The control actions are initiated at points in the operation that decrease the scan cycle duration, and make possible more frequent control actions.

INVENTOR.
Robert E. McCall
BY
William T. Fryer III
ATTORNEY

INVENTOR.
Robert E. McColl
BY
William T. Fryer III
ATTORNEY

CONTROL SYSTEM

BACKGROUND OF THE INVENTION

1. FIELD OF THE INVENTION

The present invention relates to control systems for industrial processes that include a regulator apparatus to produce or manipulate sheet materials, such as a rubber calender control system.

2. DESCRIPTION OF THE PRIOR ART

Numerous systems have been utilized to control an industrial process. These systems have attempted to maintain one or more properties of the material produced or manipulated at a predetermined value, usually referred to as a target.

The complexity of a control system for sheet materials is due to the fact that a large area and quantity of material are being produced. The industrial process usually has several controls that may need adjustment. The measurements, based on which the adjustments are made, must be representative of the controlled property. Significant improvement in sheet material quality and reduction in excess material used can occur if a control system has accurate measurements and sufficient control actions.

An example of an industrial process that requires an extensive control system is the rubber calender that produces tire fabric. The calender essentially comprises rolls that form the rubber sheet by applying raw rubber to both sides of a cord mat. These are several adjustments available to make the sheet uniform in thickness across the sheet (profile) and along the sheet length (machine direction). These adjustments include separately changing the spacing between the rolls at each end, or changing the relative spacing between the roll ends and a central portion, usually by a roll axis movement (cross-axis adjustment) or by bending one roll in the center (roll bending).

The control systems for the rubber calender have included gauges that can be manually or automatically scanned across the sheet to measure the average thickness and initiate a control action that uniformly changes the thickness in the machine direction. This adjustment was not enough, normally to maintain the desired target(s) in the profile direction and the sheet could become too thick in the center or wedge shaped.

There have been several control systems for industrial processes that attempted better control of the profile. Examples are found in U.S. Pat. No. 2,909,660, issued Oct. 20, 1959, U.S. Pat. No. 3,000,438, issued Sept. 19, 1961, U.S. Pat. No. 3,006,225, issued Oct. 31, 1961, and pending U.S. Pat. application Ser. No. 751,013, filed May 15, 1968. Each of the above patents and application is assigned to the assignee of the present application.

One of the most common control systems for a rubber calender used a single gauge that continuously scanned across the sheet, separately averaging successive zones. An edge zone average measurement was used to control the respective edge roll spacing, and the opposite edge zone average measurement was used to control the respective edge roll spacing. The average measurement in a zone in the center was used to control the cross-axis or similar adjustment. The timing sequence of one form of control system with a single gauge to obtain successive zone averages is illustrated in FIG. 1. A single-profile average computer (PAC) is used to average zone thickness. The PAC is cleared (erased) and zone 1 is measured for 8 seconds. The PAC average is read out, stored, and then the PAC is erased (2 seconds for the readout, storage and erase functions). The gauge moves continuously and the center zone is measured for 8 seconds. The center zone average is read out, stored, and the PAC erased, again in 2 seconds, and edge zone 2 is measured. The readout, storage and control action for edge zone 2 occurs in 9 seconds. The gauge then returns to its starting point at the opposite edge, taking 6 seconds with a fast scan. The total time for a cycle of FIG. 1 (gauge scans over and back) is 43 seconds.

From this example several facts on the control system cycle of FIG. 1 are apparent: (1) the edge zones are each averaged only 8 seconds; (2) not all the edge zone that is controlled by the roll end spacing is averaged. The center zone measurement starts before the first half of the sheet is averaged and ends while the gauge is scanning the second half of the sheet.

An 8 second averaging time may not be sufficient to reduce the effect of short term machine direction variations that cannot be controlled. The presence of short term machine direction variations may require a reduction in controller gain to reduce overcontrol, with some loss in control effectiveness. The failure to include one-half of the sheet width for each edge zone average makes the average less representative.

The total cycle time of 43 seconds means that a control action can be made on each edge only once every 43 seconds.

SUMMARY OF THE INVENTION

The control systems of the prior art function to improve the industrial process. Certain additional improvements can be made by embodying the features of the present invention. More representative profile measurements can be obtained. Better profile control of the edge zones and central portion is possible. A greater frequency of control actions can occur.

The advantages can be achieved in accordance with the present invention. To improve the measurement representation of the edge zone average to the true sheet average, the sheet is divided at the center and substantially all of one-half of the sheet is scanned to produce each of the edge zone averages. As a result, the average of the two edge zones will always equal substantially the total sheet width average. The center zone overlaps the edge zones, and thereby does not reduce the width available to scan for the edge or center zones. A separate PAC can be used to develop the center zone average independent of profile shape. The increased width of the edge zone increases the zone measuring time which is of benefit in obtaining better machine direction representation by reducing the effect of short term machine direction variations.

A shortened cycle to complete the zone averaging and control actions is accomplished by making the control action for the second edge zone while the gauge is returning to the start scan point. The control action for the central portion can be initiated immediately after the center zone average is obtained. In the neighborhood of 20—30 percent more control actions can be made.

Each of these improvements and the combination results in a control system that has significant advantage over prior art control systems in many industrial process applications.

DESCRIPTION OF THE PREFERRED EMBODIMENT(S)

Figure 1:
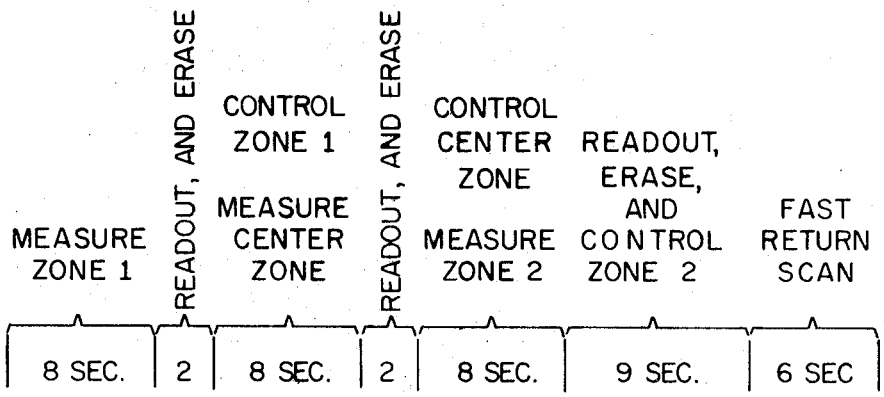
FIG. 1 is a time-function chart showing the sequence and duration of operations performed by an example of a prior art control system.
Figure 2:
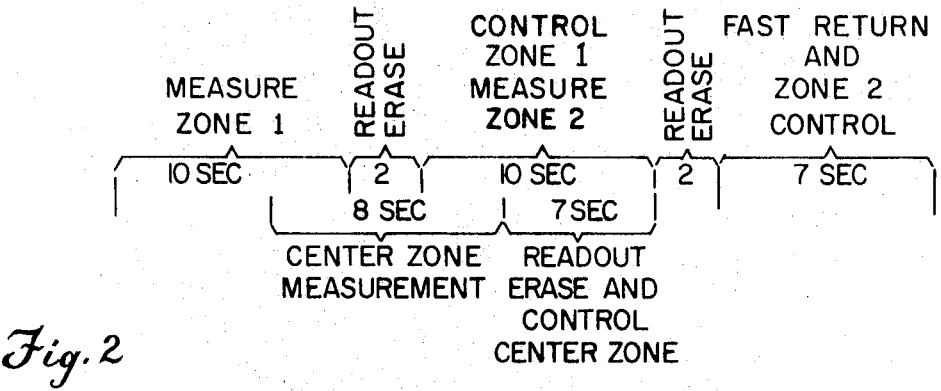
FIG. 2 is a time-function chart showing the sequence and duration of operations performed by one embodiment of a control system incorporating features of the present invention.

The illustration of FIG. 1 can now be compared with FIG. 2, to introduce a preferred embodiment of the present invention. FIG. 2 shows the gauge scanning cycle beginning at the edge of zone 1.

Zones 1 and 2 are scanned for 10 seconds each, to scan substantially one-half the sheet width for each zone. Experience indicates that 8 to 10 seconds is the minimum averaging time in order to reduce the effect of short term machine direction variations on the control effectiveness. Before the averaging of edge zone 1 is completed, the averaging of the center zone begins, and continues for 8 seconds, overlapping edge zones 1 and 2. When edge zone 1 averaging ends, its average is read out and stored (2 seconds). The control action for zone 1 begins after the zone 1 average is stored. The control action for the center zone can commence after its average is read out and stored (total 7 seconds). Alternatively, several different comparison techniques may be used, such as the one to be mentioned in relation to FIG. 4, to insure a desired relation between the edge zones 1 and 2 and/or the center zone before the central portion control action occurs. In such a case, the first or subsequent scans across the sheet may omit the central portion control action until the relation between the desired edge zones and/or center zone has been established, and then the central portion control action can occur after the center zone averaging, on each forward scan, if the required relationship exists. After the zone 2 average is read out and stored (2 seconds), the gauge moves back to the start position, with a fast return. During the fast return the control of zone 2 can occur (7 seconds to return scan and control). The total time for the cycle is 31 seconds.

Figure 3:
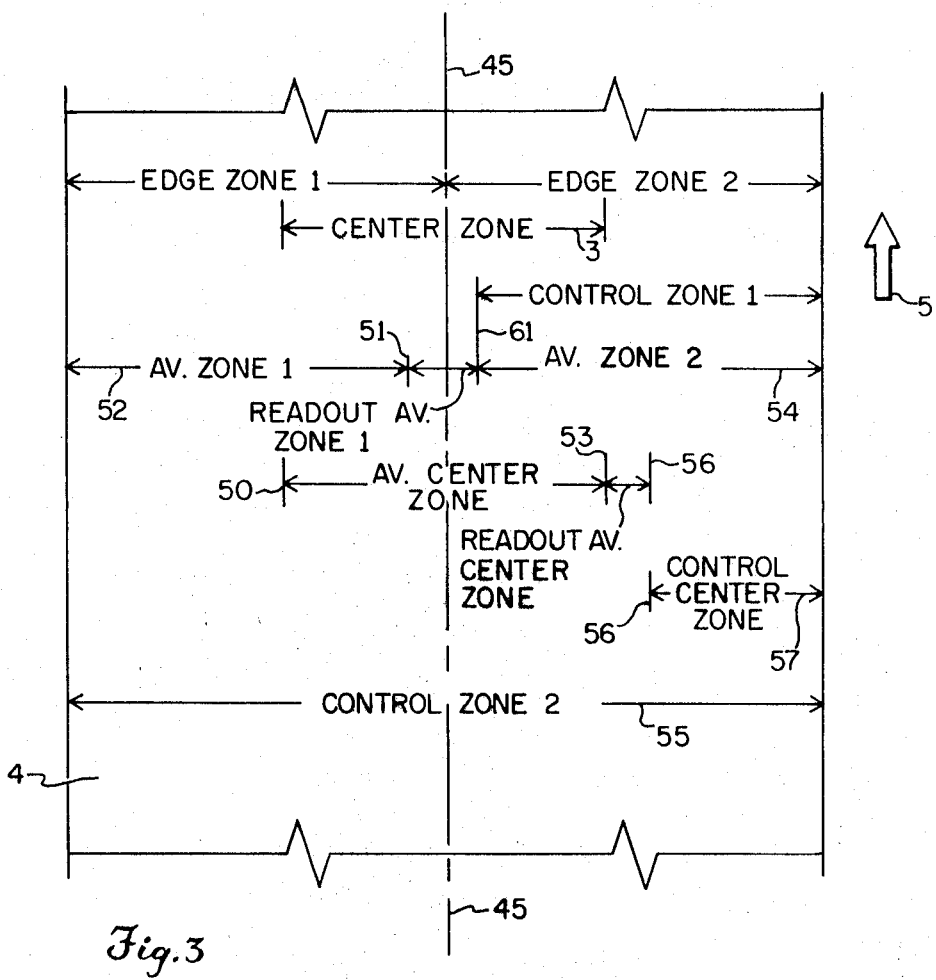
FIG. 3 is a schematic presentation of the sheet (plan view) showing the profile zones and illustrating where along the scanning path certain functions are performed.

The edge zones 1 and 2 and the center zone 3 are illustrated in relation to rubber sheet 4 in FIG. 3. Sheet 3 moves in the direction of arrow 5. Edge zone 1 is the left-half of sheet 4 and edge zone 2 is the right-half. It is edge zones 1 and 2 that are separately controlled by the rubber calender. Consequently, it is desirable to average as much of edge zones 1 and 2 to develop a truly representative control signal for each edge zone. Center zone 3 overlaps edge zones 1 and 2, being made up of contiguous portions of edge zones 1 and 2, to include the central portion that is controlled by the rubber calender cross-axis or equivalent control in relation to the edge zones. Normally, the control of the central portion is not initiated until the edge zones are substantially on target. A separate target can be used for the center zone, or a method described in the above referenced patent application can be used, comparing one edge average with the center zone average to initiate a central portion correction only if the two averages are not equal, to restore their equality.

Figure 4:
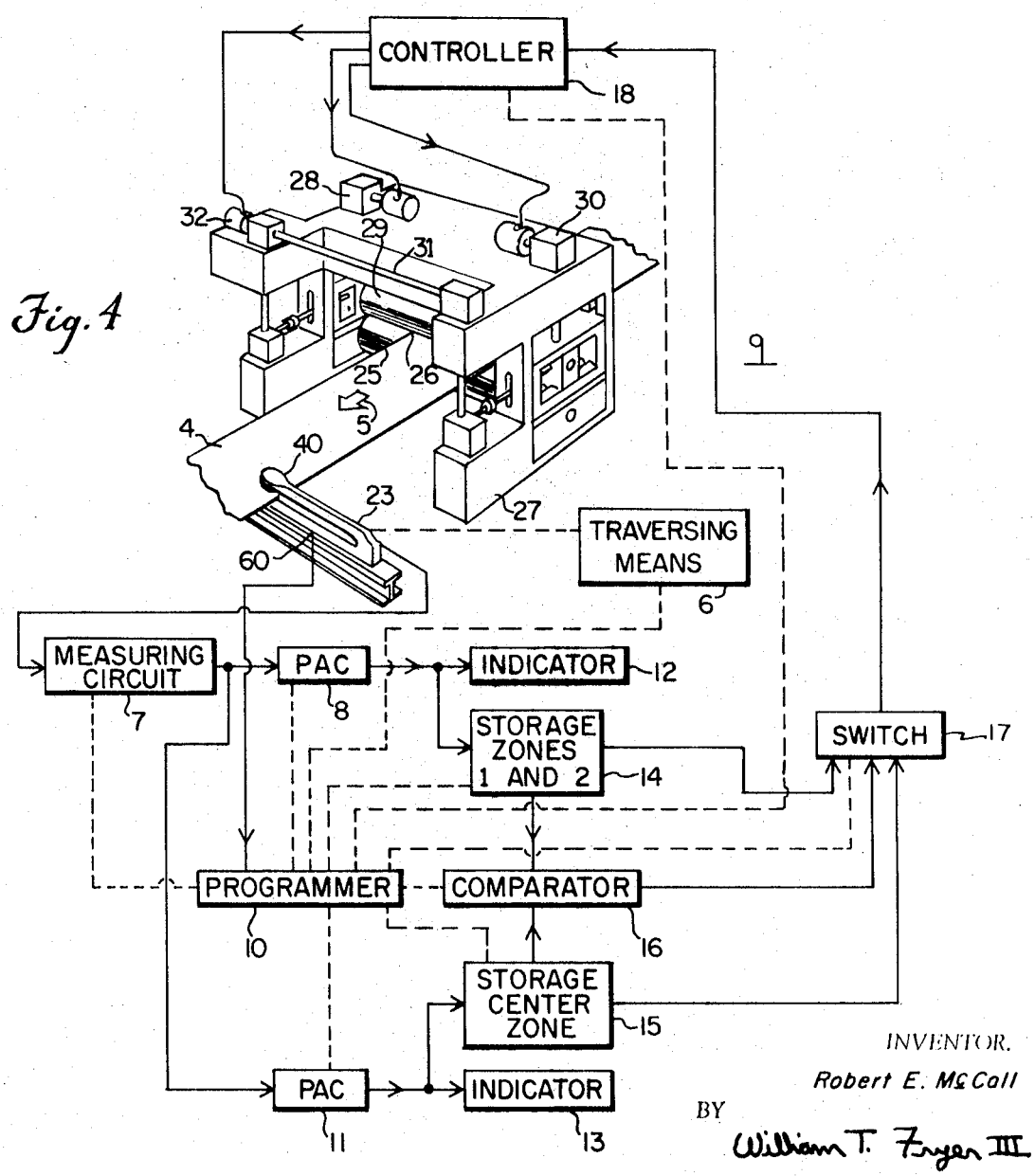
FIG. 4 is a schematic diagram of a rubber calender control system arranged in accordance with one embodiment of the present invention.

FIG. 3 shows in schematic form the areas where a single gauge 23 traversing the width of sheet 4 will be in relation to other operations of a control system 9 of FIG. 4. The measuring head 40 of gauge 23 has a transducer for measuring a material property, in this instance the thickness of the rubber in a small area. Several types of gauges can be used, such as shown in U.S. Pat. No. 2,790,945, issued Apr. 30, 1957, assigned to the assignee of the present application. Gauge 23 is moved across sheet 4 by traversing means 6, at right angles to the sheet movement direction. While gauge 23 actually traces out a diagonal line across sheet 4, for simplicity FIG. 3 shows the zones and areas of operation as if sheet 4 was not moving.

The property measuring signal from gauge 23 is processed in a conventional measuring circuit 7, coupled to profile average computer (PAC) 8 and PAC 11. The operational sequencing of control system 9 is the function of programmer 10. PAC 8 is coupled to an indicator 12 to indicate the zone average, if desired, while PAC 11 is coupled to indicator 13 for the same purpose. PAC 8 is coupled also to an information storage device 14 that can retain a zone average for subsequent use in a control action, while PAC 8 is erased. PAC 11 is coupled also to a storage device 15 that can retain the center zone average for subsequent use in a control action, while PAC 11 is erased. The use of separate storage devices is for the purpose of illustration, recognizing that a PAC could serve that function for some time before being erased. The retained zone averages in storage devices 14 and 15 can be compared by comparator 16, to indicate a difference therebetween. If there is a difference, a signal proportional to the degree is coupled to switch 17 that also receives the separate outputs of storage devices 14 and 15. The appropriate input to switch 17 is coupled to controller 18 that includes switch means (not shown) arranged to activate one of the calender adjustments: screwdown motor 28 for edge zone 1, screwdown motor 30 for edge zone 2, or cross-axis adjustment motor 32 for the center zone 3. The detail operation of such a calender with cross-axis adjustment is well known, reference being made to the above-mentioned U.S. Pat. No. 3,006,225. In general, the calender includes a frame 27; upper roll 29 that has its axis movable in a vertical plane, to change the spacing with respect to lower roll 25 for the edge zone adjustments. Lower roll 25 has its axis adjustable in a horizontal plane, pivoting about a central point, to change the relationship between the roll edges and a central portion, and thereby readjust the sheet profile. Cross-axis motor 32 uniformly drives each side of lower roll 25 in opposite directions, through drive shaft 31 to effect the cross-axis movement. A roll bending or other similar mechanism can be used instead, to change the relation between the edges and the central portion of sheet 5. Controller 18 is merely representative, for separate controllers of one or more different types may be used for each adjustment.

The sequence of operation of control system 9 can be explained by referring to FIGS. 3 and 4. Gauge 23 is initially at one each of sheet 4, adjacent edge zone 1. Gauge 23 may have just completed its automatic withdrawal standardization function, as described in the aforementioned U.S. Pat. No. 2,790,945. Programmer 10 initiates the scanning cycle, diagrammed in FIG. 2, through traversing means 6. Gauge 23 scans at a constant speed across sheet 5, to the opposite edge 15 and returns to its start position at the edge zone 1. In some applications the gauge may dwell adjacent one or both edges, although such an arrangement is not illustrated here. PAC 8 starts averaging the measuring signal from gauge 23 when measuring heat 40 is at the edge of sheet 5. The sheet edge and other positions across sheet 5 can be indicated by a position bridge in programmer 10 set up to activate a relay when a desired position is to be reached or by a switch on the gauge bracket at the appropriate position, such as illustrated by switch 60 at the center of sheet 4. PAC 8 continues to average the gauge measurement for 10 seconds almost to the center of sheet 4, as represented by centerline 45, using substantially half the sheet width for the average of edge zone 1. Substantially before measuring head 40 reaches centerline 45, programmer 10 initiates PAC 11 averaging the measuring signal at point 50. Programmer 10 stops PAC 8 averaging at point 51, so that the average of edge zone 1 is between the edge and point 51, as represented by line 52.

Programmer 10 causes the average obtained for zone 1 to be transferred to storage device 14 and to indicator 12. Then, programmer 10 erases the average from PAC 8 and PAC 8 is ready to start a new average of the measurement signal beginning at point 61. Between points 51 and 61 a time duration of 2 seconds occurs while the readout, storage and erase operations take place, so that substantially all of each sheet half is averaged for its respective edge zone. After point 61 and to the opposite edge, the stored average of zone 1 is coupled by programmer 10 to screwdown motor 28, to initiate a control action if the average is off target. A separate PAC can be used for each edge zone, to average the entire sheet width half.

The center zone averaging stops at point 53 when programmer 10 deactivates PAC 11. The center zone average is transferred to storage device 15, PAC 11 is erased, and the central portion control action can be initiated (the total time for transfer, erase and control action is 7 seconds). Preferably the central portion control action does not occur on the first scan across. Programmer 10 does not activate switch 17 or controller 18 to initiate the center portion control action at least until the next scan cycle.

The averaging of zone 2 by PAC 8 begins at point 61 and continues to the opposite edge, over the distance represented by line 54, substantially half of the sheet width. The edge zone 2 average is transferred by programmer 10 to storage device 14, and PAC 8 is erased (transfer and erase operations take 2 seconds). The control action for edge zone 2 occurs during the return scan across sheet 4, as represented by line 55.

The stored averages for zones 1 and 2 are compared with selected target(s) in controller 18, by programmer 10 coupling the respective stored average through switch 17 and connecting the appropriate target(s) in controller 18. If the edge zones are on target, no control action occurs. If either one of the edge zone averages is off target a control action is initiated to return the edge zone to target value.

The next scan cycle starts with programmer 10 retaining information on whether an edge zone control action occurred during the previous scan cycle. If a control action occurred for either edge zone during the previous scan cycle or for edge zone 1 during the current scan cycle, no central portion control action will occur during the new cycle. The reason for this sequence is that central zone adjustment is not desirable until the zone edges are on target. A detailed explanation of this technique can be found in the aforementioned U.S. Pat. No. 3,006,225. Programmer 10 sets up the proper sequence depending on the control operations. Another approach is not to initiate the central portion control action unless during the previous scan cycle both edge zone averages were within a predetermined deadband (limits) and the current edge zone 1 average is with the deadband. The same result could be achieved by comparing the previous scan edge zone averages with each other, to see if they are in a predetermined deadband, before the central portion correction is initiated. Programmer 10 can coordinate these functions.

The new average for zone 1 would be transferred to storage device 14, the last cycle averages for zones 1 and 2 having been erased at the beginning of the new scan cycle. The average for edge zone 1 is compared with the new average for center zone 3, in comparator 16 between points 53 and 56. If there is no difference, comparator 16 and a control action is not initiated. If there is a difference, programmer 10 initiates, through switch 17 and controller 18, the necessary control action to return the equality. This control technique is described in further detail in the above referenced patent application. The central portion control action occurs during the scan cycle distance from point 56 to the opposite edge, as represented by line 57. The cycle is completed as described above and successive cycles continue in accordance with the sequence outlined above.

The overall improvement resulting from control system 9 can be summarized as follows:

1. A more representative average measurement for the edge zone, by averaging substantially all of each sheet-half for the respective edge zone.
2. A greater averaging time for each edge zone, to reduce the effect of short term machine direction variations.
3. A shorter cycle of operation, including averaging and control action time, to permit more frequent control actions and, consequently, closer adjustment to target specifications.

The overlapping center zone permits the increased averaging time and the averaging of substantially all of the sheet width-half. The separate PAC for the center zone average allows the edge zone averaging and the center zone averaging to proceed separately, conserving time and allowing for a control action on the central portion during the averaging of the second edge zone. The use of the return time to control the edge zones, further reduces the cycle time.

OTHER EMBODIMENTS

The above-described embodiment is merely an example of a preferred embodiment. It is apparent to one skilled in the art that the control system can take a number of forms to carry out the broad function of the present invention. For example, the present invention can be utilized with several different industrial processes where a sheet material is formed or manipulated. The property measured and controlled can take several forms, such as weight per unit area. The transducer would be selected to measure the desired property. The individual units of the FIG. 4 control system can be of various designs, to perform the basic function of the present invention. For example, an analog or digital system processing and control technique can be employed. A special purpose or general digital computer can be programmed to perform the functions of control system 9 in combination with a gauge. Also, individual features of the present invention can be used alone or in various subcombinations with significant advantage, while the disclosed preferred combination has the most significant overall performance.

These other arrangements and changes in the disclosed embodiments of apparatus are included within the scope of the present invention as defined in the appended claims.

I claim:

1. Apparatus for maintaining a desired property profile across a sheet material passing through a regular apparatus in continuous fashion, said regulator apparatus having means including a first actuator for adjusting said property at one end portion thereof, means including a second actuator for adjusting said property at the opposite end portion thereof, means including a third actuator for adjusting said property between said end portions relative to the property at a central portion of the material said apparatus comprising:

gauge means to be located on the output side of said regulator apparatus for separately averaging said property in a first zone from substantially one edge to substantially the center of said sheet, separately averaging said property in a second zone substantially from the center of said sheet to substantially the other edge of said sheet, and separately averaging said property in a center zone including contiguous portions of said first and second zones; and control means for energizing said first actuator for said one zone in response to said first zone property average, energizing said second actuator for said second edge zone in response to said second zone property average, and energizing said third actuator for said center zone in response to said center zone property average.

2. Apparatus, as described in claim 1, wherein said property average of said first and second zones is substantially equal to said property average of the total width, independent of profile shape.

3. Apparatus, as described in claim 1, wherein said gauge means comprises a single gauge that scans across said sheet from one edge to the other, first profile average computer means coupled to said single gauge to average separately said first zone and said second zones, and a second profile average computer means coupled to said single gauge that separately averages said center zone.

4. Apparatus, as described in claim 1, wherein said gauge means comprises a single gauge for measuring said property that performs a scanning cycle including traversing continuously across said sheet from said one edge to said other edge, and returning back across said sheet; a first profile average computer means; second profile average computer means; programmer means for controlling the averaging time in relation to the position of said gauge; said programmer means initiating averaging of said single gauge measured property by said first profile average computer substantially at said one edge and terminating averaging at substantially said sheet center; first information storage means; said programmer means initiating readout of said first zone average immediately after terminating said averaging to store said first zone average in said first information storage means; said programmer means initiating averaging of said single gauge measured property by said second profile average computer means at a time when said single gauge is in said first zone and terminating averaging after said single gauge is in said second zone, to obtain a property average for said center zone, second information storage means; said programmer means initiating readout of said center zone average immediately after termination of said center zone averaging to store said first zone average in said second information storage means; said programmer means after storage of said first zone average, successively initiating erase of said first zone average from said first profile average computer, averaging said property in said second zone, and terminating averaging substantial at said other sheet edge; said stored first zone average energizing said first actuator, said stored center zone signal energizing said third actuator, and said first profile average computer average from said second zone energizing said second activator.

5. Apparatus, as described in claim 4, wherein said stored first zone property average is compared with said stored center zone property average, to energize said third actuator only if there is a difference in the compared property averages.

6. Apparatus, as described in claim 4, wherein the energization of said first actuator commences during the time said single-gauge scans said second zone, the energization of said third actuator commences during the time said single gauge is scanning said second zone, and the energization of said second actuator occurs during said back scan across said sheet.

* * * * *